US011633855B2

(12) United States Patent
Tanaka (10) Patent No.: US 11,633,855 B2
(45) Date of Patent: Apr. 25, 2023

(54) ROBOT CONTROLLER AND ROBOT CONTROL METHOD

(71) Applicant: FANUC CORPORATION, Yamanashi (JP)

(72) Inventor: Takahiro Tanaka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 336 days.

(21) Appl. No.: 17/021,272

(22) Filed: Sep. 15, 2020

(65) Prior Publication Data

US 2021/0107154 A1  Apr. 15, 2021

(30) Foreign Application Priority Data

Oct. 9, 2019  (JP) .............................. JP2019-186103

(51) Int. Cl.
*G05B 19/04* (2006.01)
*G05B 19/18* (2006.01)
*B25J 9/16* (2006.01)
*B25J 9/00* (2006.01)

(52) U.S. Cl.
CPC ........... *B25J 9/1664* (2013.01); *B25J 9/0081* (2013.01); *B25J 9/1602* (2013.01); *B25J 9/1658* (2013.01); *G05B 2219/36482* (2013.01)

(58) Field of Classification Search
CPC ...... B25J 9/1664; B25J 9/0081; B25J 9/1602; B25J 9/1658; G05B 2219/36482
See application file for complete search history.

(56) References Cited

U.S. PATENT DOCUMENTS

| 5,353,386 A  * | 10/1994 | Kasagami | B25J 9/1682 |
| | | | 700/262 |
| 5,467,003 A  * | 11/1995 | Kosaka | B25J 9/1684 |
| | | | 318/572 |
| 10,780,577 B2 * | 9/2020 | Murakami | G06N 3/08 |
| 10,987,758 B2 * | 4/2021 | Takeda | B23K 26/0884 |
| 11,365,068 B2 * | 6/2022 | Wertenberger | B07C 5/02 |

(Continued)

FOREIGN PATENT DOCUMENTS

JP  2009-181526  8/2009

*Primary Examiner* — Harry Y Oh
*Assistant Examiner* — Sohana Tanju Khayer
(74) *Attorney, Agent, or Firm* — Wenderoth, Lind & Ponack, L.L.P.

(57) ABSTRACT

To provide a robot controller and a robot control method that do not need a logic command to be associated with a teaching position for a robot, and that are thus capable of executing the logic command at a desired position and a desired timing. A robot controller includes: an operation command interpretation unit that interprets an operation command program describing a teaching operation and a teaching position for a robot, and that generates an operation command; a logic command interpretation unit that interprets a logic command program describing a logic command instructing a machining process to be performed by the robot and an execution position for the logic command, independently from the teaching operation and the teaching position, and that generates the logic command that includes the execution position; and a command execution unit that executes the operation command and the logic command.

4 Claims, 9 Drawing Sheets

(56) References Cited

U.S. PATENT DOCUMENTS

| | | | |
|---|---|---|---|
| 2011/0029235 A1* | 2/2011 | Berry | G05D 1/0204 |
| | | | 701/408 |
| 2014/0142754 A1* | 5/2014 | Dai | G05B 19/056 |
| | | | 700/245 |
| 2016/0089784 A1* | 3/2016 | Koike | B25J 9/163 |
| | | | 700/250 |
| 2018/0250831 A1* | 9/2018 | Hashimoto | B25J 13/08 |
| 2020/0156644 A1* | 5/2020 | Chae | B62D 15/0255 |
| 2020/0290204 A1* | 9/2020 | Hirabayashi | G05B 19/4069 |

* cited by examiner

[OPERATION COMMAND PROGRAM]

1: L P[1] 500mm/s FINE
2: L P[8] 500mm/s FINE

[LOGIC COMMAND PROGRAM]

1: P[7] PROCESS_OFF (DO[3]=OFF)
2: P[6] PROCESS_ON (DO[3]=ON)
3: P[5] PROCESS_OFF (DO[2]=OFF)
4: P[4] PROCESS_ON (DO[2]=ON)
5: P[3] PROCESS_OFF (DO[1]=OFF)
6: P[2] PROCESS_ON (DO[1]=ON)

```
1: L P[1] 500mm/s FINE
2: L P[2] 500mm/s CNT100  PROCESS_ON (DO[1]=ON)
3: L P[3] 500mm/s CNT100  PROCESS_OFF (DO[1]=OFF)
4: L P[4] 500mm/s CNT100  PROCESS_ON (DO[2]=ON)
5: L P[5] 500mm/s CNT100  PROCESS_OFF (DO[2]=OFF)
6: L P[6] 500mm/s CNT100  PROCESS_ON (DO[3]=ON)
7: L P[7] 500mm/s CNT100  PROCESS_OFF (DO[3]=OFF)
8: L P[8] 500mm/s FINE
```

ROBOT CONTROLLER AND ROBOT CONTROL METHOD

This application is based on and claims the benefit of priority from Japanese Patent Application No. 2019-186103, filed on 9 Oct. 2019, the content of which is incorporated herein by reference.

BACKGROUND OF THE INVENTION

Field of the Invention

The present invention relates to a robot controller and a robot control method. In particular, with regard to an industrial robot, the present invention relates to a robot controller and a robot control method that are capable of executing, independently from an execution situation of a teaching program for a robot operation, a logic command that controls a machining process at a desired position.

Related Art

Figure 7A:
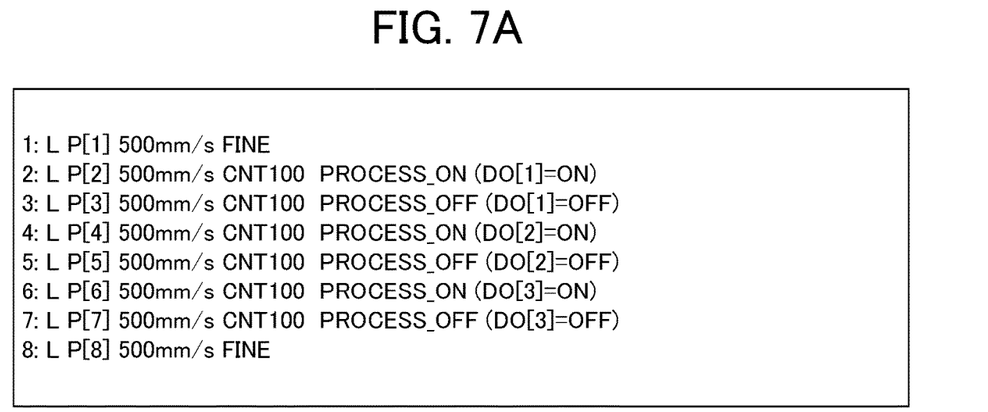
FIG. 7A is a view illustrating an example of a machining program used in the conventional technique.
Figure 7B:
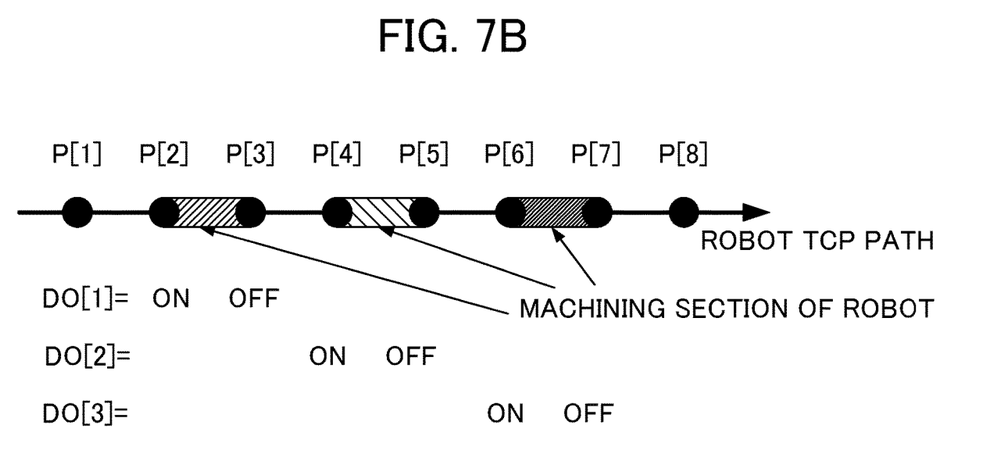
FIG. 7B is a conceptual diagram illustrating an example of a relationship between teaching positions and starting points and ending points of machining processes in the machining program used in the conventional technique.

FIG. 7A illustrates an example of a teaching program used to control a robot. In the example illustrated in FIG. 7A, operation commands and teaching positions respectively forming pairs are inserted at desired positions for executing logic commands, in a command for an operation ranging from a starting point P [1] to an ending point P [8]. FIG. 7B is a conceptual diagram of a content describing the teaching program illustrated in FIG. 7A. In various robot applications where machining proceeds together with a robot on a robot path, such as laser machining, arc welding, and dispensing, a robot controller that controls the robot is generally used to create a teaching program as illustrated in FIG. 7A to teach a robot operation.

More specifically, in the teaching program illustrated in FIG. 7A, a first row defines that a robot starts to move at a speed of 500 mm/s toward the teaching position P [1]. A second row defines that the robot does not stop at the teaching position P [2], but starts to move toward the next teaching position P [3], and turns ON a machining process designated as DO [1] at the teaching position P [2]. Here, the teaching position P [2] represents a desired position for executing the logic command DO [1]. The term "CNT100" means that the robot does not stop at the teaching position P [2], but starts to move toward the next teaching position P [3]. The number "100" indicates a degree of overlap between the operation defined by the immediately previous row and the operation defined by the current row. A third row defines that the robot does not stop at the teaching position P [3], but starts to move toward the next teaching position P [4], and turns OFF the machining process designated as DO [1] at the teaching position P [3]. A fourth row defines that the robot does not stop at the teaching position P [4], but starts to move toward the next teaching position P [5], and turns ON a machining process designated as DO [2] at the teaching position P [4]. A fifth row defines that the robot does not stop at the teaching position P [5], but starts to move toward the next teaching position P [6], and turns OFF the machining process designated as DO [2] at the teaching position P [5]. A sixth row defines that the robot does not stop at the teaching position P [6], but starts to move toward the next teaching position P [7], and turns ON a machining process designated as DO [3] at the teaching position P [6]. A seventh row defines that the robot does not stop at the teaching position P [7], but starts to move toward the next teaching position P [8], and turns OFF the machining process designated as DO [3] at the teaching position P [7]. An eighth row defines that the robot stops at the teaching position P [8].

At this time, the robot controller allows the robot and an external peripheral device (a programmable logic controller (PLC) or one of various application controllers for laser oscillators) to perform communications via input and output signals based on digital input (DI)/digital output (DO) or analogue input (AI)/analogue output (AO), for example, or to perform serial communications to control machining processes including laser welding in line with robot operations.

Japanese Unexamined Patent Application, Publication No. 2009-181526 discloses another example of a teaching program. In the technique according to Japanese Unexamined Patent Application, Publication No. 2009-181526, as illustrated in the drawings of Japanese Unexamined Patent Application, Publication No. 2009-181526, one teaching program includes a row regarding an operation command for a robot, and a row regarding a command that turns ON or OFF welding gas or arc, for example. After a teaching point corresponding to a welding location, for example, is defined in the row regarding the operation command, arc welding starts or ends in accordance with the command that turns ON or OFF welding gas or arc, for example.

Patent Document 1: Japanese Unexamined Patent Application, Publication No. 2009-181526

SUMMARY OF THE INVENTION

Since, as described above, the teaching program teaches various commands on the basis of teaching positions for a robot, there has been such a restriction that a logic command that controls a machining process such as laser welding be always associated with a teaching position for the robot.

Figure 8A:
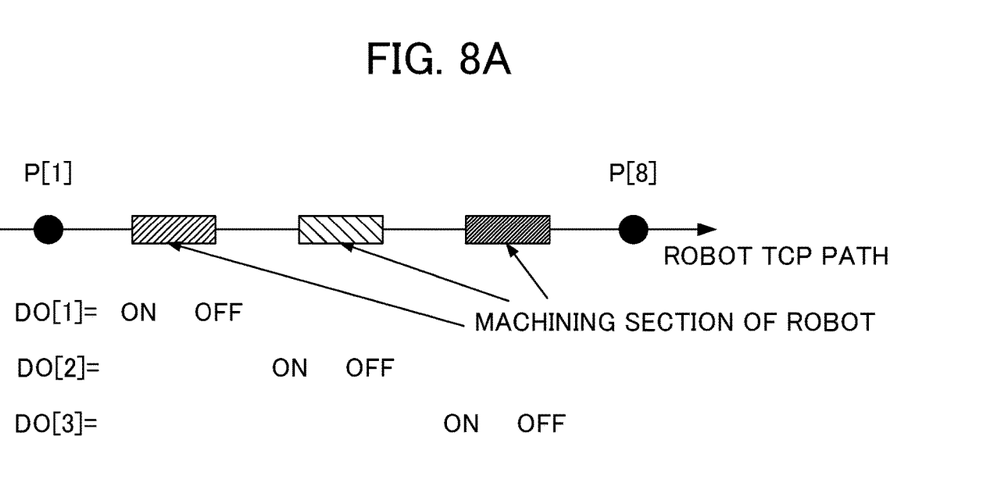
FIG. 8A is a conceptual diagram illustrating an example of a relationship between teaching positions and starting points and ending points of machining processes, which is unachievable with the conventional technique.

FIG. 8A is a conceptual diagram illustrating an example where logic commands are not respectively associated with teaching positions. Although, in the example in FIG. 8A, only the two points that are P [1] and P [8] are illustrated as teaching positions, "ON" and "OFF" of the respective logic commands of DO [1], DO [2], and DO [3] are associated with neither P [1] nor P [8]. In an ordinary teaching program, it is impossible to cause a logic command to be independent from a teaching position as described above.

In particular, to successively teach machining sections each having a short pitch, teaching positions for a robot have to be increased in accordance with increased numbers of starting terminals and ending terminals of the machining sections, leading to a complex and overly long teaching program that is undesirable in terms of maintenance.

If teaching positions for a robot become too dense, operation-plan processing for the robot may be delayed, possibly extending a cycle time.

Furthermore, since logic commands have to be associated with teaching positions for a robot, alignment with an order of executing rows regarding robot operation commands is required. Under these restrictions, a location for executing a machining process is normally limited to lie within a section of teaching positions before and after a row regarding the machining process itself, preventing a signal to be output at a desired timing.

Figure 8B:
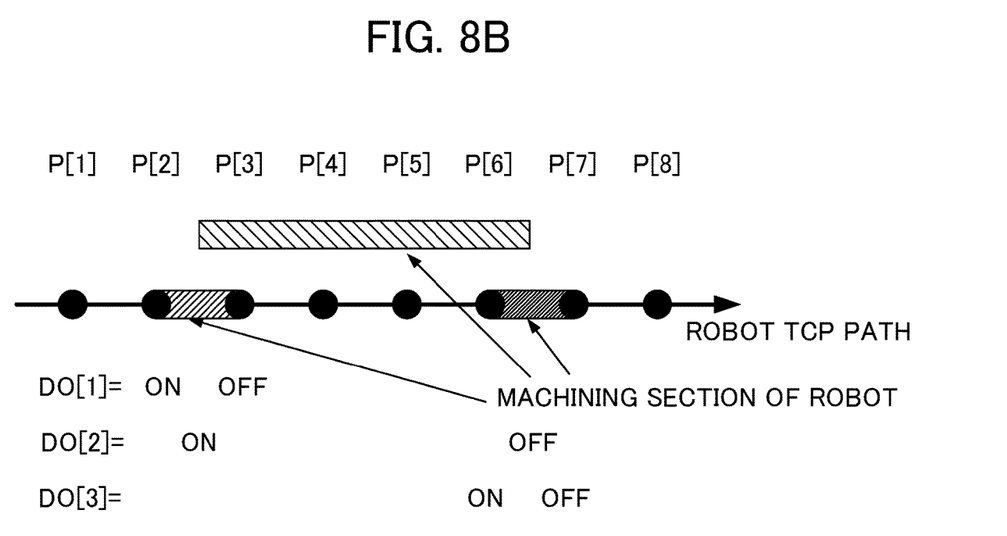
FIG. 8B is a conceptual diagram illustrating an example of a relationship between teaching positions and starting points and ending points of machining processes, which is unachievable with the conventional technique.

For example, FIG. 8B is a conceptual diagram illustrating an example where an order of operation commands and an order of logic commands differ from each other. In the example in FIG. 8B, "ON" of the logic command DO [1] is executed at the teaching position P [2], "OFF" of the logic command DO [1] is executed at the teaching position P [3], and, after that, "ON" of the logic command DO [2] is executed between "ON" of DO [1] and "OFF" of DO [1].

However, in an ordinary teaching program, in accordance with an order of operation commands, "ON" of DO [1] is executed at the teaching position P [2], "OFF" of DO [1] is executed at the teaching position P [3], and, at a teaching position after the teaching position P [3], "ON" of DO [2] is executed. It is therefore impossible to execute logic commands in an order different from the order of the operation commands, as illustrated in FIG. 8B.

An object of the present invention is to provide a robot controller and a robot control method capable of causing a logic command to be independent from an operation command (a teaching position) for a robot, and of executing the logic command at a desired position and a desired timing.

An aspect of the present disclosure is a robot controller including: an operation command interpretation unit that interprets an operation command program describing a teaching operation and a teaching position for a robot, and that generates an operation command; a logic command interpretation unit that interprets a logic command program describing a logic command instructing a machining process to be performed by the robot and an execution position for the logic command, independently from the teaching operation and the teaching position, and that generates the logic command that includes the execution position; and a command execution unit that executes the operation command and the logic command.

According to an aspect, a logic command can be caused to be independent from an operation command (a teaching position) for a robot, and the logic command can be executed at a desired position and a desired timing.

DETAILED DESCRIPTION OF THE INVENTION

An embodiment of the present invention will now be described herein with reference to FIGS. 1 to 6C.

1 Configuration of Embodiment

Figure 1:
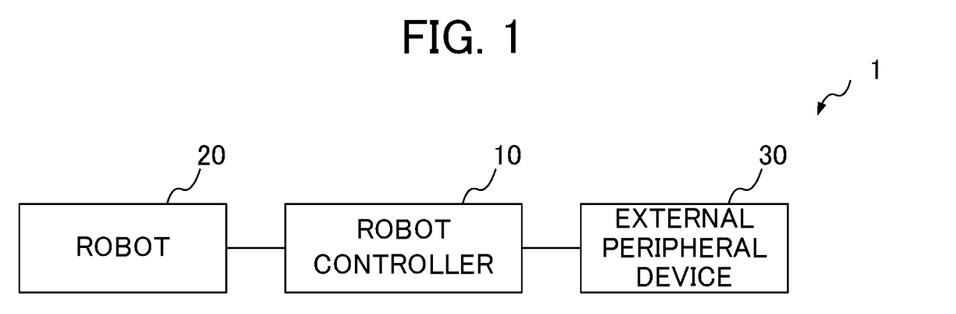
FIG. 1 is an overall configuration diagram of a robot control system according to an embodiment.

FIG. 1 illustrates an overall configuration of a robot control system 1 according to an embodiment of the present invention. The robot control system 1 includes a robot controller 10, a robot 20, and an external peripheral device 30. Furthermore, the robot controller 10 and the robot 20 are communicably coupled with each other. The robot controller 10 and the external peripheral device 30 are also communicably coupled with each other. Note that, although not illustrated in FIG. 1, the robot controller 10, the robot 20, and the external peripheral device 30 may be communicably coupled with each other via a network.

The robot controller 10 represents a device that controls the robot 20. Specifically, the robot controller 10 stores teaching programs, teaching data, and operation parameters, for example, to be used for operation control and machining control of the robot 20, and executes the teaching programs on the basis of the teaching data and the operation parameters to control the robot 20.

The robot 20 is, but not limited to, an articulated robot such as a six-axis vertical articulated robot or a four-axis vertical articulated robot. The robot 20 may be an orthogonal coordinate robot, a SCARA (selective compliance assembly robot arm) robot, or a parallel link robot, for example.

The external peripheral device 30 is a PLC or one of various application controllers for laser oscillators.

In a case where, in the robot control system 1 illustrated in FIG. 1, the external peripheral device 30 serves as a controller for a laser oscillator, for example, the robot controller 10 performs communications via input and output signals or performs serial communications with the robot 20 and the external peripheral device 30, to control an operation of the robot 20, and to control a laser machining process to be performed by the robot 20.

Figure 2:
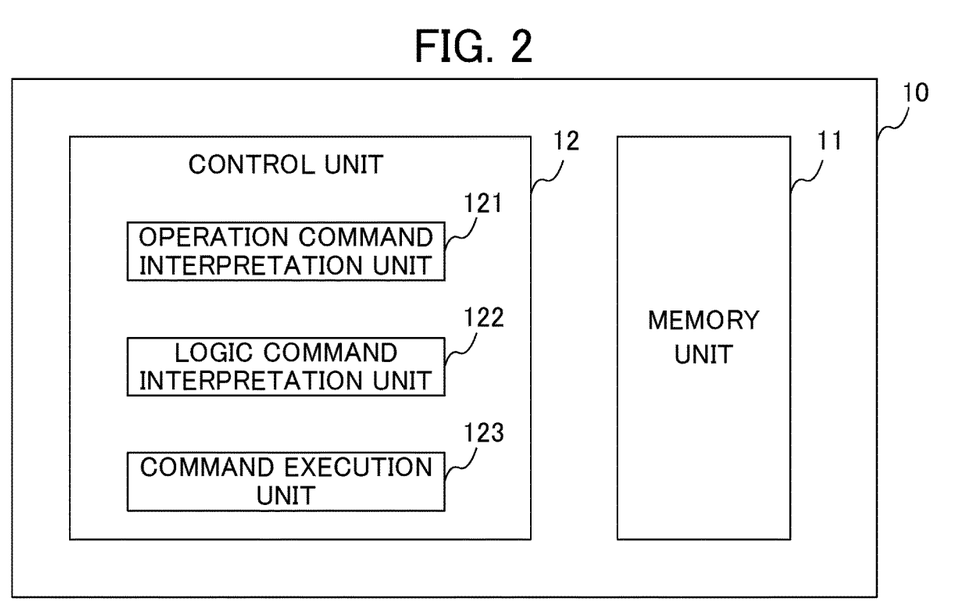
FIG. 2 is a functional block diagram of a robot controller according to the embodiment.

FIG. 2 is a functional block diagram of the robot controller 10. The robot controller 10 includes a memory unit 11 and a control unit 12.

The memory unit 11 stores an operation command program describing teaching operations and teaching positions for the robot 20, and a logic command program describing logic commands instructing machining processes to be performed by the robot 20 and execution positions for the logic commands, independently from the teaching operations and the teaching positions.

Figure 3A:
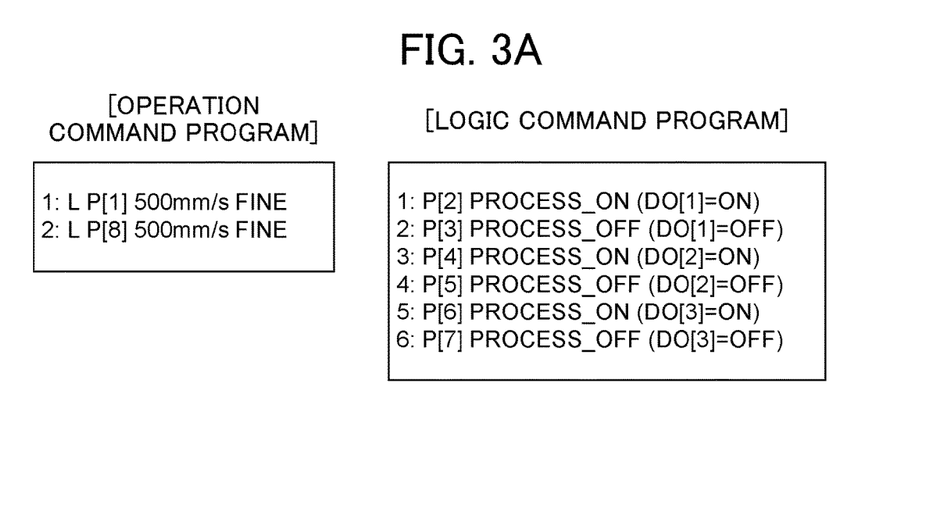
FIG. 3A is a view illustrating an example of a machining program used in the robot controller according to the embodiment.
Figure 3B:
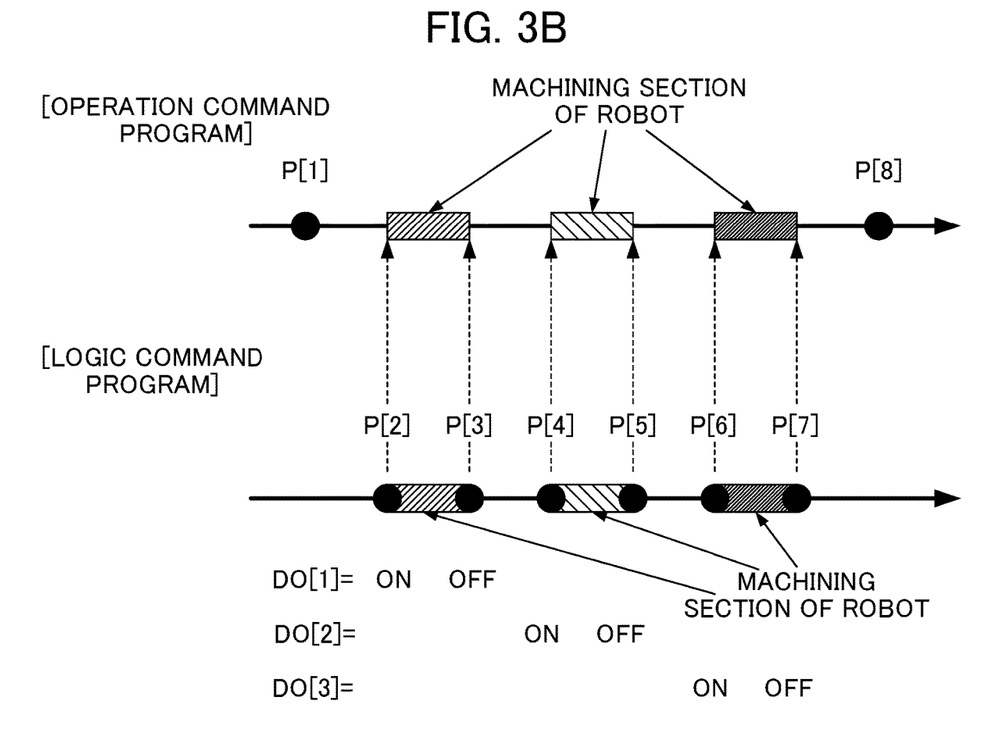
FIG. 3B is a conceptual diagram of a content of the machining program used in the robot controller according to the embodiment.

FIG. 3A is a view illustrating an example of an operation command program and a logic command program to be executed in the robot controller 10 according to the present embodiment. FIG. 3B is a conceptual diagram of a content describing the operation command program and the logic command program illustrated in FIG. 3A.

As illustrated in FIG. 3A, the operation command program instructs operations of the robot 20 at the teaching positions, respectively.

In the example in FIG. 3A, the operation command program instructs a robot operation command causing the robot to head from a teaching position P [1] to a teaching position P [8].

The logic command program also instructs start and end of machining processes at positions that are independent from the teaching positions designated in the operation command program.

In a first row in the logic command program illustrated in FIG. 3A, a machining process DO [1] is instructed to start at the position P [2]. In a second row, the machining process DO [1] is instructed to end at the position P [3]. In a third row, a machining process DO [2] is instructed to start at the position P [4]. In a fourth row, the machining process DO [2] is instructed to end at the position P [5]. In a fifth row, a machining process DO [3] is instructed to start at the position P [6]. In a sixth row, the machining process DO [3] is instructed to end at the position P [7].

The control unit 12 is one that is known among those skilled in the art, and that includes a central processing unit (CPU), a read-only memory (ROM), a random access memory (RAM), and a complementary metal-oxide semiconductor (CMOS) memory, for example, which are configured to communicate with each other via a bus.

The CPU represents a processor that wholly controls the robot controller 10. The CPU is configured to read, via the bus, system programs and application programs stored in the ROM, to wholly control the robot controller 10 in accordance with the system programs and the application programs, and to cause, as illustrated in FIG. 2, the control unit 100 to achieve functionality of an operation command interpretation unit 121, a logic command interpretation unit 122, and a command execution unit 123.

The operation command interpretation unit 121 interprets an operation command program describing a teaching operation and a teaching position for a robot 20, as described above, and generates an operation command.

The logic command interpretation unit 122 interprets a logic command program describing a logic command instructing a machining process to be performed by the robot 20 and an execution position for the logic command, as described above, and generates the logic command including the execution position.

The command execution unit 123 starts, upon start of a teaching program, a task process to be performed by the operation command interpretation unit 121 and a task process to be performed by the logic command interpretation unit 122, and executes the operation command generated by the operation command interpretation unit 121 to monitor robot positions while the robot 20 is operating to execute, at a timing when the robot 20 passes through each of the execution positions for the logic commands, each of the logic commands generated by the logic command interpretation unit 122.

Therefore, upon execution, by the robot controller 10, of the operation command program and the logic command program exemplified in FIG. 3A, it is possible, as illustrated in FIG. 3B, within a route coupling the teaching position P [1] and the teaching position P [8] designated in the operation command program, to start the machining process DO [1] at the position P [2], to end the machining process DO [1] at the position P [3], to start the machining process DO [2] at the position P [4], to end the machining process DO [2] at the position P [5], to start the machining process DO [3] at the position P [6], and to end the machining process DO [3] at the position P [7].

Note that, in a logic command program, positions at which execution of a logic command starts and ends are preferably, but not limited to, positions on a path along which a robot travels in accordance with an operation command program, as described above. For example, positions at which execution of a logic command starts and ends may be proximal-most positions to an execution position for a machining process, on a path along which a robot travels in accordance with an operation command program.

2 Effects Achieved by the Embodiment

To teach a logic command that controls a machining process such as laser welding, in the robot controller 10 according to the present embodiment, it is possible to execute the logic command at a desired position and a desired timing, independently from an operation command (a teaching position) for the robot 20.

To even successively teach machining sections each having a short pitch, in the robot controller 10 according to the present embodiment, it is not necessary to increase teaching positions in accordance with increased numbers of starting terminals and ending terminals of the machining sections, leading to simple implementation of a teaching program, and ease of maintenance and ease of visibility for the teaching program and the like.

Furthermore, in the robot controller 10 according to the present embodiment, a number of teaching points for the robot 20 can be minimized. Operation-plan processing for the robot 20 can also be made lighter, allowing the robot 20 to exert its original performance.

Furthermore, since, in the robot controller 10 according to the present embodiment, alignment between an order of executing operation commands and an order of executing logic commands for the robot 20 is not required, the logic commands can be executed at desired timings, regardless of teaching positions regarding operations of the robot 20.

Figure 4:
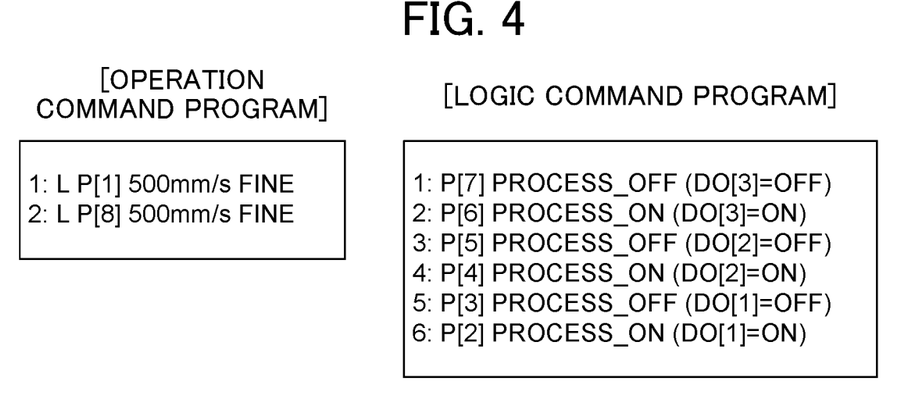
FIG. 4 is a view illustrating an example of a machining program used in the robot controller according to the embodiment.

FIG. 4 is a view illustrating another example of an operation command program and a logic command program to be executed by the robot controller 10 according to the present embodiment. More specifically, when the example illustrated in FIG. 4 is compared with the example illustrated in FIG. 3A, an order of rows forming the logic command program is inverted.

In the robot controller 10 according to the present embodiment, even though, as illustrated in FIG. 4, the teaching position P [1] to the teaching position P [8] are described in this order in the operation command program, and the position P [7], the position P [6], the position P [5], the position P [4], the position P [3], and the position P [2] are described in this order in the logic command program, the logic commands are respectively executed at timings as the robot 20 passes through the position P [2] to the position P [7], regardless of the described orders.

Furthermore, to adjust the timing for executing a logic command, in the conventional techniques, it is necessary to finely adjust teaching positions for robot operations in rows forming a pair, leading to a changed operation plan, and eventually a changed operation path at each adjustment. On the other hand, since, in the robot controller 10 according to the present embodiment, a logic command program is separated from an operation command program, the timing for executing a logic command can only be finely adjusted, impacting neither an operation plan nor an operation path.

Figure 5:
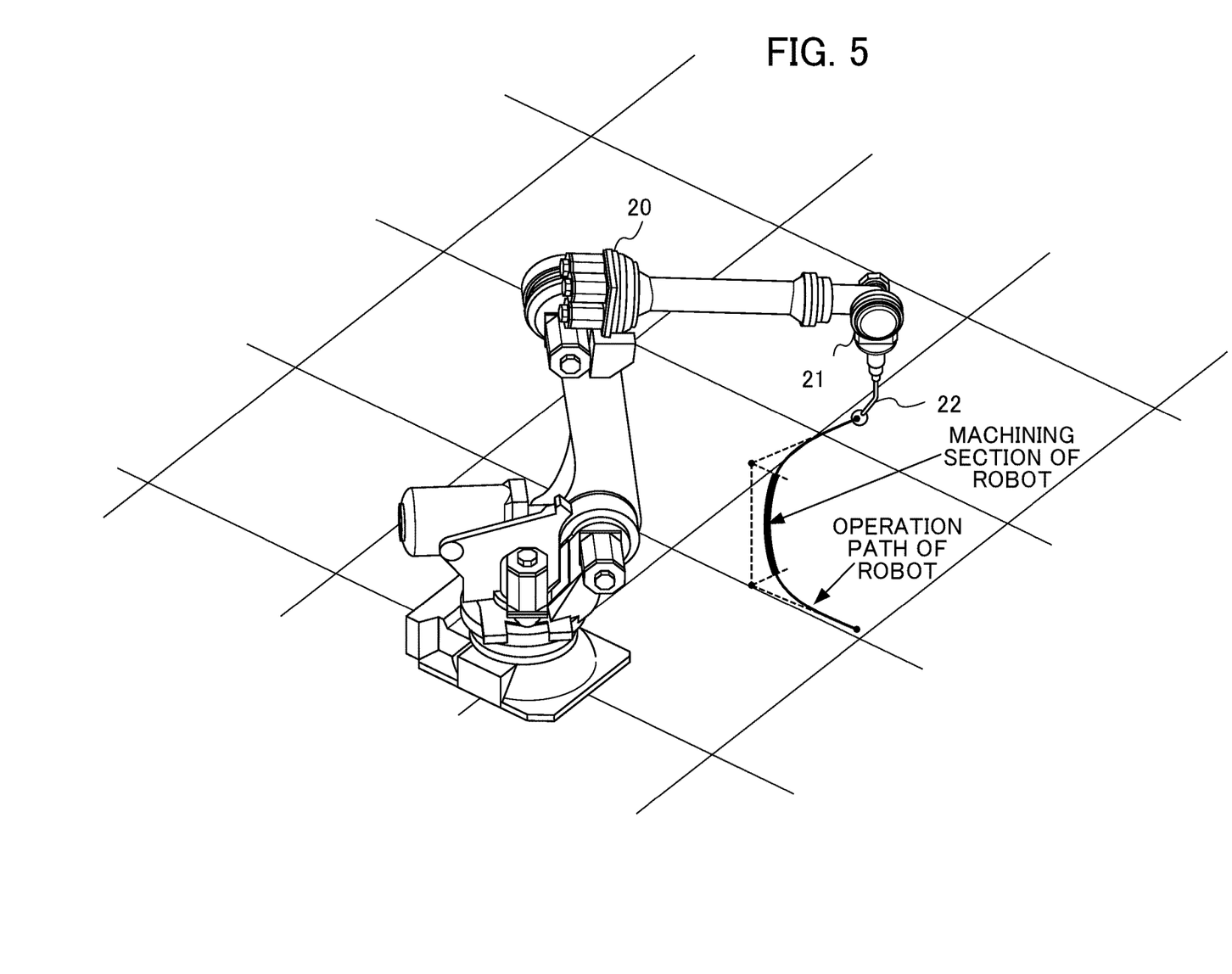
FIG. 5 is a view illustrating an example of an operation path and a machining section of a robot controlled by the robot controller according to the embodiment.

FIG. 5 is a view illustrating the robot 20, an operation path of a tool 22 mounted on a hand 21 that the robot 20 includes, and a machining section present on the operation path. The tool 22 travels in an order of P [1]→P [2]→P [3]→P [4], starts machining at P [2], and ends the machining at P [3].

Figure 6A:
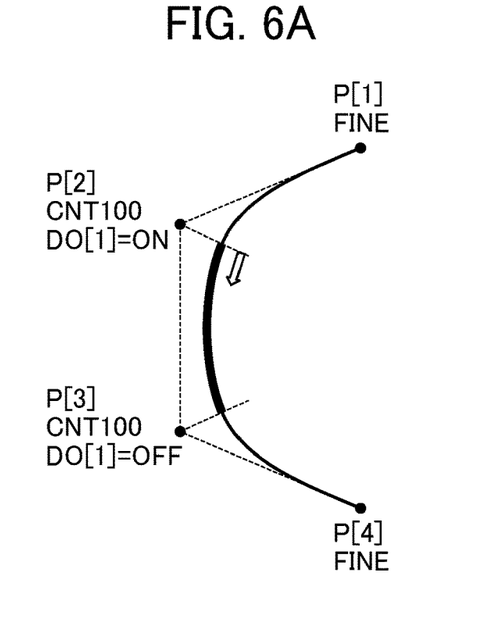
FIG. 6A is a view illustrating an example of an operation path and a machining section of the robot controlled by the robot controller according to the embodiment.

FIG. 6A is a view specifically illustrating the operation path and the machining section illustrated in FIG. 5, and is a view illustrating the operation path and the machining section before a signal output timing at the teaching position P [2] is adjusted.

Figure 6B:
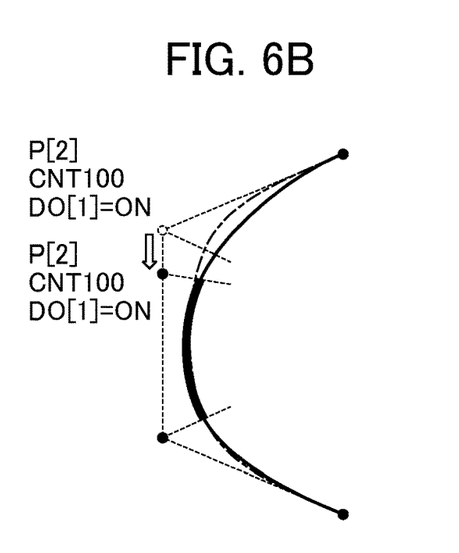
FIG. 6B is a view illustrating a method of adjusting the timing at which machining starts, by a robot controller according to a conventional technique.

FIG. 6B is a view illustrating changes in the operation path and the machining section after a machining start timing is adjusted under a conventional technique. Since, in the conventional technique, a starting point of a machining process and a teaching position regarding an operation of the robot 20 are paired in a teaching program, as illustrated in FIG. 7A, for example, it is necessary to finely adjust the position of the teaching position regarding the operation of the robot 20, i.e., the teaching position P [2] in the example in FIG. 6B, leading to a changed operation plan, and eventually a changed operation path at each adjustment. Therefore, it is necessary to repeat adjustments of signal timings and adjustments of teaching positions present on an operation path.

Figure 6C:
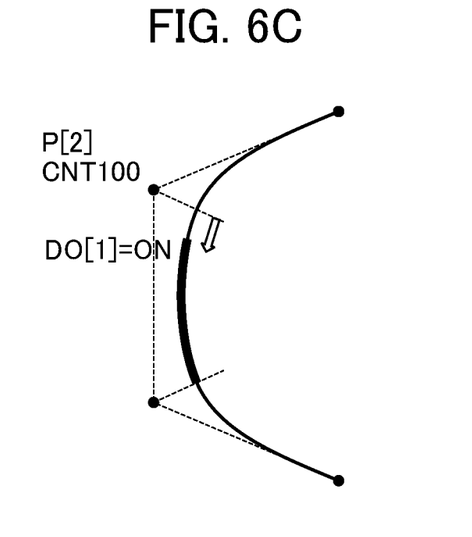
FIG. 6C is a view illustrating a method of adjusting the timing at which machining starts, by the robot controller according to the embodiment.

FIG. 6C is a view illustrating an operation path and a machining section after a machining start timing is adjusted in the robot controller 10 according to the present embodiment. Compared with the operation path and the machining section before signal output timings are adjusted, as illustrated in FIG. 6A, the operation path is not changed, but only the timing at which a machining section starts is delayed. This is because the logic command program is separated from the operation command program, and therefore only the timing of executing a logic command can be finely adjusted without changing a teaching position regarding an operation of the robot 20. Therefore, a change of a machining section impacts neither an operation plan nor an operation path.

3 Implementation Examples

An information output terminal such as a tablet device may be caused to display an operation path taught to the robot 20. The position and the timing at which a signal is to be output, and eventually the position and the timing at which a logic command that controls process-machining is to be executed may be directly touched with a finger or a device such as a touch-pen on the displayed operation path, and may be designated on the operation path taught to the robot 20.

Therefore, it is possible, on the basis of the designated position at which the logic command is to be executed, to generate and execute a logic command program, together with an operation command program. Since a user of the robot controller 10 can intuitively designate the timing for executing a logic command, and can teach a process-machining command, it is possible to shorten the time required for teaching and operation-checking.

In addition to serial communications and communications via signals to be input and output with the external peripheral device 30, the robot control method according to the present invention can be comprehensively applied to all logic commands that are executable regardless of the operational situation of the robot 20.

EXPLANATION OF REFERENCE NUMERALS

1 Robot control system
10 Robot controller
11 Memory unit
12 Control unit
20 Robot
30 External peripheral device
121 Operation command interpretation unit
122 Logic command interpretation unit
123 Command execution unit

What is claimed is:

1. A robot controller, comprising:
an operation command interpretation unit that interprets an operation command program describing a teaching operation and a teaching position for a robot, and that generates an operation command;
a logic command interpretation unit that interprets a logic command program describing a plurality of logic commands instructing a machining process to be performed by the robot and an execution position for each of the logic commands, independently from the teaching operation and the teaching position, and that generates the logic commands that each include a corresponding one of the execution positions; and
a command execution unit that (i) starts, upon start of a teaching program, a task process to be performed by the operation command interpretation unit and a task process to be performed by the logic command interpretation unit, (ii) executes the operation command generated by the operation command interpretation unit, and (iii) executes, at a timing when the robot passes through each of the execution positions for the logic commands, each of the logic commands generated by the logic command interpretation unit,
wherein the execution of the operation command is performed independently from the execution of the plurality of logic commands such that a timing and position at which each of the logic commands is executed is independent of the teaching position.

2. The robot controller according to claim 1, wherein the execution positions for the logic commands are present on an operation path of the robot, the operation path being based on the teaching operation and the teaching position.

3. The robot controller according to claim 1,
wherein the command execution unit executes, in a case where at least one of the execution positions in the logic command program is not present on an operation path of the robot, the corresponding logic command at a proximal-most position to the execution position for the machining process on the operation path, and
wherein the operation path is based on the teaching operation and the teaching position.

4. A robot control method, comprising:
an operation command interpretation step of interpreting an operation command program describing a teaching operation and a teaching position for a robot, and of generating an operation command;
a logic command interpretation step of interpreting a logic command program describing a plurality of logic commands instructing a machining process to be performed by the robot and an execution position for each of the logic commands, independently from the teaching operation and the teaching position, and of generating the logic commands that each include a corresponding one of the execution positions; and
a command execution step of (i) starting, upon start of a teaching program, a task process to be performed in the operation command interpretation step and a task process to be performed in the logic command interpretation step, (ii) executing the operation command, and (iii) executing, at a timing when the robot passes through each of the execution positions for the logic commands, each of the logic commands,
wherein the execution of the operation command is performed independently from the execution of the plurality of logic commands such that a timing and position at which each of the logic commands is executed is independent of the teaching position.

\* \* \* \* \*